United States Patent [19]

Antony et al.

[11] Patent Number: 4,842,183
[45] Date of Patent: Jun. 27, 1989

[54] CRACK REPAIR IN HOT SECTION COMPONENTS OF SUPERALLOYS

[75] Inventors: Kenneth C. Antony, Old Saybrook; Vincent J. Russo, West Haven, both of Conn.

[73] Assignee: Turbine Components Corporation, Branford, Conn.

[21] Appl. No.: 125,356

[22] Filed: Nov. 25, 1987

[51] Int. Cl.⁴ ............................................. B23K 31/02
[52] U.S. Cl. .................................... 228/119; 228/206; 228/175
[58] Field of Search ............... 228/119, 206, 218, 219, 228/175

[56] References Cited

U.S. PATENT DOCUMENTS

| 4,016,394 | 4/1977 | Hecht et al. | 228/206 |
| 4,028,787 | 6/1977 | Creteua et al. | 228/119 |
| 4,078,977 | 3/1978 | Fountain | 228/119 |
| 4,226,712 | 5/1981 | Park et al. | 228/175 |
| 4,285,459 | 8/1981 | Baladjanian et al. | 228/238 |
| 4,493,451 | 1/1985 | Clark et al. | 228/238 |

FOREIGN PATENT DOCUMENTS 2124126  2/1984  United Kingdom ............... 228/119

OTHER PUBLICATIONS

The HF "Fluoride-Ion", Cleaning Technique for Superalloys, Pochet, Louis F.

Primary Examiner—M. Jordan
Attorney, Agent, or Firm—Thomas R. Shaffer

[57] ABSTRACT

A process is provided in which engine-induced cracks are first converted to weld-induced cracks caused to occur in a chromium halide environment then a braze alloy is brought into contact with the weld-induced cracks and the whole results in a far superior product.

4 Claims, 1 Drawing Sheet

CRACK REPAIR IN HOT SECTION COMPONENTS OF SUPERALLOYS

This invention relates to crack repair in hot section components of superalloys and particularly to the brazing of weld induced cracks.

It is well known that various hot section components of turbines are cast out of nickel base superalloys containing appreciable amounts of both titanium and/or aluminum. Cracks, such as occur during engine service are virtually impossible to repair.

Direct weld repair of engine-induced cracks is possible. However, the heat-affected zones surrounding the weld repair are thermodynamically unstable and invariably crack as a result of strain-aging during post-weld heat treatment or subsequent engine service. Direct weld repair, in effect, simply converts engine-induced cracks into weld-induced cracks.

Direct braze repair of engine-induced cracks is also possible provided all contaminant oxides are removed from the crack surface. Various methods of contaminant oxide removal by fluoride-ion reduction have been proposed in recent years. However, none of the fluoride-ion processes developed to date have proven to be effective due in large part to inconsistencies in oxide composition and abundance on the inner crack surfaces.

We have developed a method which eliminates these problems and makes possible the repair of cracks in nickel-base superalloy gas turbine vanes, for example, which were heretofore impossible.

We have found that weld-induced cracks caused to occur in a chromium halide environment do not require oxide removal from the weld-induced crack surfaces and are readily amendable to vacuum braze repair. This finding enables repair of engine-induced cracks in nickel-base superalloy gas turbine components by:

(1) conventional weld repair of engine-induced cracks;

(2) post-weld (repair) heat treatment in a chromium halide environment, any halide system will do but we prefer to use a chromium halide in the presence of ammonium chloride thereby converting engine-induced cracks into weld-induced cracks;

(3) conventional braze repair of weld-induced cracks—preferably in vacuum using nickel-base braze alloys such as AMl-100B, AMl-775 or modifications thereof.

In the foregoing we have set out certain objects, purposes and advantages of our invention. However, other objects, purposes and advantages will be apparent from a consideration of the application and drawings in which.

Figure 1:
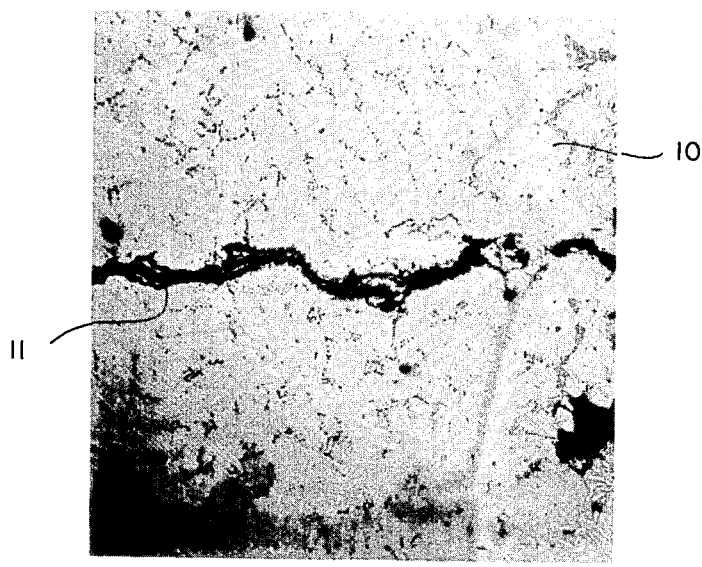
FIG. 1 is a photomicrograph of a turbine vane with engine induced cracks.
Figure 2:
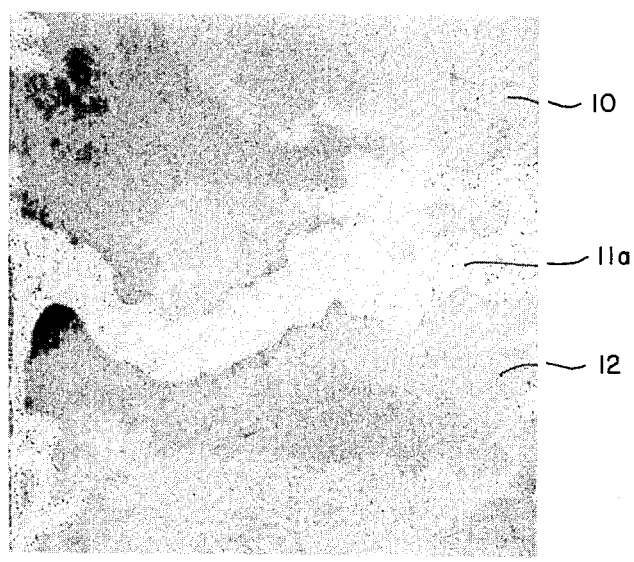
FIG. 2 is a photomicrograph of a turbine vane as treated by our invention.

Referring to the drawings we have shown a photomicrograph of a turbine vane 10 having an engine-induced crack 11. In FIG. 2 we have converted the engine-induced crack 11 to a weld induced crack 11a, caused to occur in a chromium halide environment to the point where the braze metal enters every crack and crevice and the final turbine vane has a surface finish 12 better than the original and has a surface polish which is unique.

In accomplishing this we have gone purely to the technique set out above and have welded the engine induced cracks, caused post-weld heat treatment cracks to occur in a halide environment and brazed the subsequent cracks.

In the above practice we have set out certain embodiments of this invention however it will be understood that this invention may be otherwise practiced within the scope of the following claims.

We claim:

1. The process of treating engine induced cracks in turbine vanes and other components comprising the steps of:
   (a) converting the engine induced cracks to post induced cracks by welding;
   (b) causing said weld induced cracks to occur in a chromium halide environment and
   (c) vacuum brazing said weld-induced cracks.

2. A process as claimed in claim 1 wherein the external surfaces are coated with chromium.

3. A process as claimed in claim 1 or 2 wherein the braze alloy is a nickel base braze alloy.

4. A process as claimed in claim 3 wherein the braze alloy is selected from the group AMI-100B and AMI-775 and modifications thereof.

* * * * *